Patented Sept. 14, 1948

2,449,081

UNITED STATES PATENT OFFICE 2,449,081

COMPOSITION FOR CONTROL OF POULTRY COCCIDIOSIS

Orley J. Mayfield, Neal F. Morehouse, and Arthur W. Walde, Charles City, Iowa, assignors to Dr. Salsbury's Laboratories, a corporation of Iowa No Drawing. Application July 3, 1942, Serial No. 449,672

15 Claims. (Cl. 167—53.1)

1

The present invention relates to the discovery of substances valuable for the treatment of coccidiosis in poultry. The present discovery has to do with the finding that the organic arsenics, a p-hydroxy phenylarsonic acid, phenylarsonic acid, and their sodium, potassium and ammonium salts, when administered in the feed or drinking water will satisfactorily control coccidiosis in poultry.

This application is in part a continuation of our application Serial No. 368,912, filed December 6, 1940, now Patent No. 2,449,080 for an improved substance for and method of treatment of coccidiosis in poultry.

Coccidiosis in poultry is a condition produced by various species of protozoa, namely: *Eimeria mitis, E. praecox, E. acervulina, E. maxima, E. necatrix* and *E. tenella* which multiply in the lining of the intestines producing a severe inflammation of these tissues. Birds infested with these protozoa manifest symptoms, depending entirely upon the number of protozoa present in the intestinal tract, varying from mild bowel disorders to severe bowel disorders, emaciation, hemorrhage, anemia and death.

Various forms of organic arsenicals have been used as medical agents. Many such agents, which have been used extensively in medicines, such as atoxyl and the arsphenamines, are constructed for intravenous use and are unstable in water solutions, thereby making them unsuitable for administration to poultry by adding these substances to the drinking water for the control of coccidiosis. We have found that certain arsonic acids and many of their salts, including the sodium, potassium and ammonium salts, which are freely soluble in water, stable in water, and are readily consumed in the water by the birds, have value as medicating agents making it possible to control coccidiosis in poultry by their administration in the drinking water as well as in the feed.

We further find that the therapeutic dose of these arsonic acid compounds for the control of coccidiosis is non-toxic, and may be administered with safety, whereas the therapeutic dose of inorganic arsenic compounds is so near the toxic dose that much care must be used in their administration.

Thus it has been found that the arsonic acid compounds within the purview of the invention may be administered by oral ingestion in concentration sufficient to manifest a therapeutic effect in the control of coccidiosis, as by the prevention or treatment thereof, essentially without causing any toxicity, or at least without resulting in excessive toxicity. There follow typical examples of the use of suitable arsonic acids and certain salts thereof, for the purposes of the invention.

2

Example 1

Twelve New Hampshire Reds, about 6 weeks of age, were weighed and divided into three groups of four birds to a group, so that the mean weight of each group was nearly equal on November 20, 1940.

*Purpose.*—To test the value of potassium para-hydroxy phenyl arsonate in the control of intestinal coccidiosis due to *Eimeria maxima* in chickens.

Medication was continued for fourteen days.

Birds Nos. 1 to 4 inclusive received .025% potassium para-hydroxy phenyl arsonate in the drinking water.

Birds Nos. 5 to 8 inclusive received .05% potassium para-hydroxy phenyl arsonate in the drinking water.

Birds Nos. 9 to 12 inclusive received unmedicated drinking water and were held as controls for this experiment.

*Infection.*—On the second day after medication started each bird was infected with approximately 100,000 sporulated oocysts of *Eimeria maxima.*

Two of the birds in the first group showed slight coccidia in the droppings six to eight days after infection, but none of the birds in the second group showed any coccidia in the droppings at any time after infection, and the control birds all showed substantial numbers of coccidia in the droppings six days after infection which persisted for the next two days.

This experiment shows that potassium para-hydroxy phenyl arsonate is highly effective in the control of intestinal coccidiosis due to *Eimeria maxima* when used at the rate of 0.025% in the drinking water and is 100% effective when used at the rate of 0.05% in the drinking water.

Example 2

Twelve New Hampshire Red chicks, about 6 weeks old, were weighed and divided into three groups of four birds to a group, so that the mean weight of each group was nearly equal.

*Purpose.*—To test the value of potassium para-hydroxy phenyl arsonate in the control of cecal coccidiosis due to *Eimeria tenella* in chickens.

Medication was continued for 14 days.

Birds Nos. 1 to 4 inclusive received 0.025% potassium para-hydroxy phenyl arsonate in the drinking water.

Birds Nos. 5 to 8 inclusive received 0.05% potassium para-hydroxy phenyl arsonate in the drinking water.

Birds Nos. 9 to 12 inclusive received unmedicated drinking water and were held as controls for this experiment.

*Infection.*—Six days after medication was started each bird was infected with approximately 100,000 sporulated oocysts of *Eimeria tenella*.

No hemorrhage occurred in two of the chicks receiving potassium para-hydroxy phenyl arsonate at the rate of 0.025% in the drinking water, another showed only slight hemorrhage while the fourth suffered severe hemorrhage. Thus, it is shown that this preparation has considerable value for the control of cecal coccidiosis due to *Eimeria tenella*. At 0.05% it was 100% effective in the prevention of hemorrhage. No mortality occurred in either group while the control birds all suffered very severe hemorrhages and three of the four chicks died.

Example 3

Twelve New Hampshire chicks, about 6 weeks of age, were weighed and divided into three groups of four birds to a group, so that the mean weight of each group was nearly equal.

*Purpose.*—To test the value of ammonium para-hydroxy phenyl arsonate for the control of cecal coccidiosis due to *Eimeria tenella* in chickens.

Medication was continued for 14 days.

Birds Nos. 1 to 4 inclusive received 0.025% ammonium para-hydroxy phenyl arsonate in the drinking water.

Birds Nos. 5 to 8 inclusive received 0.05% ammonium para-hydroxy phenyl arsonate in the drinking water.

Birds Nos. 9 to 12 inclusive received unmedicated drinking water and were held as controls for this experiment.

*Infection.*—Six days after starting medication each bird was infected with approximately 100,000 sporulated oocysts of *Eimeria tenella*.

No hemorrhage occurred in one of the chicks receiving ammonium para-hydroxy phenyl arsonate at the rate of 0.025% in the drinking water and the others were not as heavy as the controls, thus showing that the preparation at this dosage has considerable value for the control of cecal coccidiosis due to *Eimeria tenella*. At 0.05% it was 100% effective in the prevention of hemorrhage. No mortality occurred in either group of treated birds while the control birds all suffered very severe hemorrhage and three of the four chicks died Both groups of treated birds showed good weight gains during the experiment, growing equally as well as the controls.

Example 4

Twelve New Hampshire chicks, about 6 weeks of age were weighed and divided into two groups of six birds to a group, so that the mean weight of each group was nearly equal.

*Purpose.*—To test the value of ammonium para-hydroxy phenyl arsonate, when used with phenolsulfonates, for the prevention of cecal coccidiosis due to *Eimeria tenella* in chickens.

Medication was continued for 10 days.

Birds Nos. 1 to 6 inclusive received 12 grams of the following mixture per gallon of drinking water:

|  | Per cent |
|---|---|
| Sodium phenolsulfonate | 31.50 |
| Ammonium phenolsulfonate | 15.75 |
| Ammonium para-hydroxy phenyl arsonate | 7.50 |
| Lactose | 36.92 |
| Boric acid | 8.33 |
|  | 100.00 |

This gives a concentration of 0.0238% ammonium para-hydroxy phenyl arsonate in the drinking water.

Birds Nos. 7 to 12 inclusive received unmedicated drinking water and were held as controls for this experiment.

*Infection.*—Two days after starting medication each chick was infected with approximately 100,000 sporulated oocysts of *Eimeria tenella*.

No bloody droppings appeared in any of the treated chicks, thus showing that ammonium para-hydroxy phenyl arsonate when used with phenolsulfonates in a concentration of 0.0238% in the drinking water, was 100% effective in the prevention of hemorrhage. No mortality occurred in the treated group while the control birds all suffered very severe hemorrhage and one of the six chicks died.

Example 5

Twelve New Hampshire cross-bred chicks about 6 weeks of age were weighed and divided into three groups of four birds to a group, so that the mean weight of each group was nearly equal.

*Purpose.*—To determine the comparative value of ammonium para-hydroxy phenyl arsonate when used alone and when used with phenolsulfonates for the prevention of cecal coccidiosis due to *Eimeria tenella* in chickens.

Medication was continued for 11 days.

Birds Nos. 1 to 4 inclusive received 0.047% ammonium para-hydroxy phenyl arsonate No. 69-C in the drinking water.

Birds Nos. 5 to 8 inclusive received 12 grams per gallon of drinking water of the following mixture:

|  | Per cent |
|---|---|
| Sodium phenolsulfonate | 31.50 |
| Ammonium phenolsulfonate | 15.75 |
| Ammonium para-hydroxy phenyl arsonate | 15.00 |
| Lactose | 29.42 |
|  | 91.67 |
| Dry granules of the above mixture | 91.67 |
| Boric acid | 8.33 |
|  | 100.00 |

This gives a concentration of 0.047% ammonium para-hydroxy phenyl arsonate in the drinking water.

Birds Nos. 9 to 12 inclusive received unmedicated drinking water and were held as controls for this experiment.

*Infection.*—Three days after starting medication each chick was infected with approximately 100,000 sporulated oocysts of *Eimeria tenella*.

No hemorrhage occurred in two of the chicks treated with ammonium para-hydroxy phenyl arsonate at the rate of 0.047% without phenolsulfonates, only moderate hemorrhage appeared in the third while the fourth showed severe hemorrhage. No hemorrhage occurred in two of the chicks treated with 0.047% ammonium para-hydroxy phenyl arsonate in a phenolsulfonate formula, only slight hemorrhage in the other two. No mortality occurred in either group while the control birds all suffered very severe hemorrhage and three of the four chicks died. Both groups of treated birds showed weight gains during the experiment.

Therefore, these tests show that ammonium para-hydroxy phenyl arsonate when used with phenolsulfonates and without phenolsulfonates at a concentration of 0.047% in the drinking water, was very effective in the control of cecal coccidiosis due to *Eimeria tenella*.

Example 6

Twelve New Hampshire Red chicks about seven weeks old were divided into three groups of 4 birds each. Medication was continued eleven days. Birds Nos. 1–4, inclusive, received a composition in tablet form at the rate of 14 tablets per gallon of drinking water throughout the experiment. Birds Nos. 5–8, inclusive, received 16 tablets per gallon of drinking water throughout the experiment. Birds Nos. 9–12, inclusive, received unmedicated water throughout the experiment and these birds were held as controls for the experiment.

The tablets were compounded according to the following formula:

| | Grams |
|---|---|
| Sodium phenolsulphonate | 2000 |
| Ammonium phenolsulphonate | 1000 |
| Sodium p-hydroxy phenylarsonate | 539.71 |
| Lactose | 2280.65 |
| Boric acid | 528.89 |
| | 6349.25 |

Three days later each bird was infected with approximately 100,000 sporulated oocysts of *Eimeria maxima*.

None of the treated birds showed coccidia in the droppings, but the control birds all presented upwards of 200 oocysts per field by the 6th day after infection.

In this experiment, the composition containing sodium p-hydroxy phenylarsonate as an active ingredient, controlled coccidiosis due to *Eimeria maxima* 100%. In the above experiment the treated birds received sodium p-hydroxy phenyl arsonate at the rate of .038% and .043% respectively, in the drinking water.

Similar tests performed with aqueous solutions of sodium p-hydroxy phenyl arsonate in a concentration of 0.052% and as high as 0.061% were found to be 100% effective in the control of coccidiosis due to *Eimeria maxima* and *Eimeria tenella*.

Example 7

On May 1, 1940, 12 Black Minorca chicks hatched March 14, 1940, were divided into three groups of four birds each. Birds Nos. 1–4, inclusive, received sodium p-hydroxy phenylarsonate at the rate of .052% in all their drinking water consumed throughout the experiment. Birds Nos. 5–8, inclusive, received sodium p-hydroxy phenylarsonate at the rate of .061% in all their drinking water consumed throughout the experiment. Birds Nos. 9–12, inclusive, served as controls and they were given no medication but allowed the same feed and quarters as the other eight birds. On May 1, 1940, each chick was infected with approximately 100,000 sporulated oocysts of *Eimeria maxima*.

None of the treated birds had any coccidia present in their droppings six days after infection, and no coccidia appeared on the 6th, 7th, 8th or 9th day following infection; whereas the controls had over 200 oocysts per field present on the sixth day and nearly as many on the ninth day after infection. In this experiment, sodium p-hydroxy phenylarsonate when given at the rate of .052% and .061% in the water controlled coccidiosis due to *Eimeria maxima* 100%.

Example 8

On May 1, 1940, 12 Black Minorca chicks hatched March 14, 1940, were divided into three groups of four birds each. Birds Nos. 1–4, inclusive, received sodium p-hydroxy phenylarsonate at the rate of .052% in all their drinking water consumed throughout the experiment. Birds Nos. 5–8, inclusive, received sodium p-hydroxy phenylarsonate at the rate of .061% in all their drinking water consumed throughout the experiment. Birds Nos. 9–12, inclusive, served as controls and they were given no medication but allowed the same feed and quarters as the other eight birds. On May 6, 1940, each chick was infected with approximately 100,000 sporulated oocysts of *Eimeria tenella*.

None of the treated birds showed any evidence of hemorrhages, but the controls suffered severe hemorrhages on the sixth day after infection, which had not entirely ceased on the eighth day after, and one control died. In this experiment sodium p-hydroxy phenylarsonate when administered in the water at the rate of .052% and .061% was 100% effective in controlling coccidiosis due to *Eimeria tenella*.

Example 9

Twenty-four White Leghorn chicks about five weeks of age were divided into 6 groups of 4 birds each. Birds Nos. 1–4, inclusive, received a composition in tablet form, hereinafter called No. 1, at the rate of 10 tablets per gallon of drinking water in all they consumed throughout the experiment. Birds Nos. 5–8, inclusive, received the same composition, No. 1, at the rate of 14 tablets per gallon of drinking water in all they consumed throughout the experiment. Birds Nos. 9–12, inclusive, received the same composition, No. 1, at the rate of 18 tablets per gallon of drinking water in all they consumed throughout the experiment. Birds Nos. 13–16, inclusive, received a similar composition, hereinafter called No. 2, at the rate of 10 tablets per gallon of drinking water in all they consumed throughout the experiment. Birds Nos. 17–20, inclusive, received a similar composition, hereinafter called No. 3, at the rate of 10 tablets per gallon of drinking water in all they consumed throughout the experiment. Birds Nos. 21–24, inclusive, received unmedicated water and these birds were held as controls for the experiment. The formula for tablets Nos. 1, 2 and 3 is as follows:

| | No. 1 | | No. 2 | | No. 3 | |
|---|---|---|---|---|---|---|
| Sodium p-hydroxy phenylarsonate | 29.43 g. | 19.6% | 15.11 g. | 15.11% | 13.6 g. | 13.6% |
| Sodium phenolsulphonate | 36.73 g. | 24.5% | 29.00 g. | 29.00% | 30.51 g. | 30.51% |
| Zinc phenolsulphonate | 58.86 g. | 39.25% | 39.24 g. | 39.24% | 39.24 g. | 39.24% |
| Lactose | 12.18 g. | 8.12% | 8.12 g. | 8.12% | 8.12 g. | 8.12% |
| Copper arsenite | .3 g. | .2% | .2 g. | .2% | .2 g. | .2% |
| Boric acid | 9.4 g. to 104 g. granules | 8.33% | 7 g. to 74 g. granules | 8.33% | 7.25 g. to 80 g. granules | 8.33% |

Six days later each chick was infected with approximately 100,000 sporulated oocysts of *Eimeria tenella*.

In this experiment the composition designated No. 1 containing 19.6% sodium p-hydroxy phenylarsonate controlled coccidiosis due to *Eimeria tenella* 100% when fed at the rate of 14 and 18 tablets per gallon of drinking water.

The composition designated No. 2 containing 15.11% sodium p-hydroxy phenylarsonate when fed at the rate of 10 tablets per gallon of drinking water failed to control this disease.

The composition designated No. 3 containing 13.6% sodium p-hydroxy phenylarsonate controlled this disease 100% in two of the four birds treated and caused the infection to be very light in two other birds in this test.

All control birds showed a heavy infection with *Eimeria tenella* and one bird died.

One of the important advantages of the invention is the readiness with which the sodium, potassium and ammonium salts of p-hydroxy phenylarsonic acid may be combined with other water soluble ingredients in a tablet for dissolution in water, thereby enabling the medicine to be readily administered in drinking water at any desired strength to suit different ages and kinds of birds.

The invention may be applied in many other ways for treating conditions for which arsenic has been found to have value as a specific, being much less toxic than metallic arsenic and inorganic arsenic compounds heretofore utilized for similar purposes.

We claim the following as our invention:

1. A composition for the control of coccidiosis in poultry comprising a water soluble salt of p-hydroxy phenyl arsonic acid, and a water soluble phenol sulphonate.

2. A composition for the control of coccidiosis in poultry comprising ammonium p-hydroxy phenyl arsonate and a water soluble phenol sulphonate.

3. An aqueous solution for the control of coccidiosis in poultry comprising ammonium p-hydroxy phenyl arsonate in the approximate concentration range of 0.025%–0.05%.

4. An aqueous solution for the control of coccidiosis in poultry comprising potassium p-hydroxy phenyl arsonate in the approximate concentration range of 0.025%–0.05%.

5. A composition for the control of coccidiosis in poultry containing an alkali metal p-hydroxy phenyl arsonate in the approximate concentration range of 0.023%–0.061%.

6. A composition for the control of coccidiosis in poultry comprising a poultry feed containing a water-soluble salt of p-hydroxy phenyl arsonic acid.

7. A composition for the control of coccidiosis in poultry comprising a poultry feed containing a water-soluble salt of p-hydroxy phenyl arsonic acid in the approximate concentration range of 0.023%–0.061%.

8. A water soluble composition for the control of coccidiosis in poultry containing sodium p-hydroxy phenyl arsonate and a phenol sulfonate.

9. A substance for the control of coccidiosis in poultry comprising sodium p-hydroxy phenyl arsonate in aqueous solution and in the approximate concentration range of 0.38% to 0.05%.

10. A composition for the control of coccidiosis in poultry comprising a poultry feed containing ammonium p-hydroxy phenyl arsonate in concentration sufficient to manifest a therapeutic effect on coccidiosis without causing excessive toxicity.

11. An aqueous solution for the control of coccidiosis in poultry containing an alkali metal p-hydroxy phenyl arsonate in the approximate concentration range of 0.025% to 0.05%.

12. A composition for the control of coccidiosis in poultry containing a water soluble salt of p-hydroxy phenyl arsonic acid in the approximate concentration range of 0.023% to 0.061%.

13. An aqueous solution for the control of coccidiosis in poultry containing an alkali metal p-hydroxy phenyl arsonate in the approximate concentration range of 0.023% to 0.061%.

14. A composition for the control of coccidiosis in poultry comprising a poultry feed containing an alkali metal p-hydroxy phenyl arsonate.

15. A composition for the control of coccidiosis in poultry containing an alkali metal p-hydroxy phenyl arsonate and a water soluble phenolsulphonate.

ORLEY J. MAYFIELD.
NEAL F. MOREHOUSE.
ARTHUR W. WALDE.

REFERENCES CITED

The following references are of record in the file of this patent:

UNITED STATES PATENTS

| Number | Name | Date |
| --- | --- | --- |
| 2,158,446 | Werft | May 16, 1939 |

OTHER REFERENCES

Beach et al., Circular 300 of the University of California Experiment Station, page 13, Dec. 1925 (167–53.1).

Organic Syntheses, vol. 4, pages 65–68 (1925).